July 21, 1942.  C. W. HANSELL  2,290,327
FREQUENCY MONITOR AND DETECTOR
Original Filed May 19, 1939

INVENTOR
CLARENCE W. HANSELL
BY
ATTORNEY

Patented July 21, 1942

2,290,327

UNITED STATES PATENT OFFICE 2,290,327

FREQUENCY MONITOR AND DETECTOR

Clarence W. Hansell, Rocky Point, N. Y., assignor to Radio Corporation of America, a corporation of Delaware Original application May 19, 1939, Serial No. 274,601. Divided and this application September 28, 1940, Serial No. 358,775

9 Claims. (Cl. 250—39)

This application is a division of my application #274,601, filed May 19, 1939, relating to frequency monitors and, more particularly, to a means for detecting and measuring the departure of an alternating current wave from a predetermined periodicity.

An object of the present invention is to provide a novel voltage regulator for alternating voltages and especially for radio frequency voltages.

Another object of the invention is to provide a voltage regulator especially for use with frequency monitors to overcome effects of varying input voltages.

Still another object of the present invention is to maintain alternating voltages within predetermined limits.

Another object of the present invention is the provision of a frequency monitor in which the indication of the instrument is nearly independent of the power level of the alternating current wave applied thereto.

Briefly, the present invention includes a very constant sharply resonant circuit element through which a high frequency current flows with a phase relation with respect to an applied voltage which changes rapidly with a change in frequency of the voltage. Two portions of the current whose phase is sensitive to frequency are then combined with currents of the same frequency, the phase relations of which are less sensitive to frequency, to provide two resultant alternating currents which vary in magnitude differentially when the frequency of the currents is changed. Portions of the differentially variable alternating currents are then used to produce two differentially variable direct currents which, in turn, operate a suitable indicating instrument, such as a current ratio meter. The ratio of the direct currents, or reading of the meter, is then a measure of the frequency of the alternating currents in relation to the resonant frequency of the very constant sharply resonant circuit.

Since the invention, as so far described, is somewhat sensitive to input voltage variations, I provide means between the input and the measuring circuit for assuring that a constant potentrial is applied to the measuring circuit. The regulating means includes resistances which vary in value with the current flow therethrough connected across the tuned input circuit and in series with coupling transformer windings. The variations may be filament lamps or in an appropriate connection "Thyrite" may be used.

Figure 1:
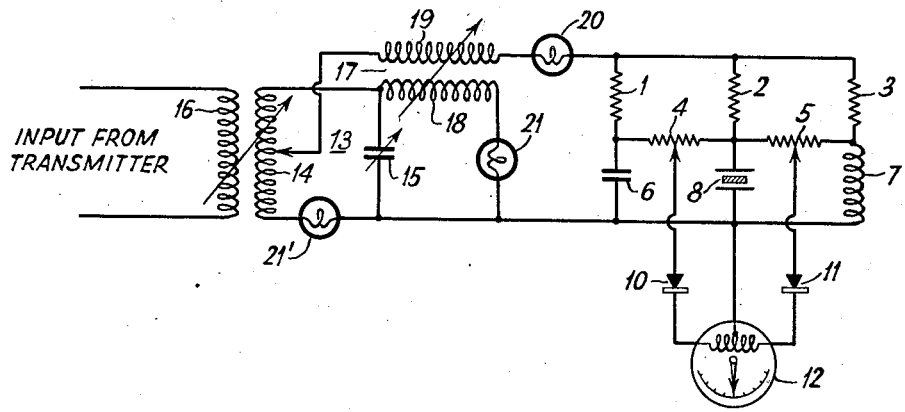
Figure 2:
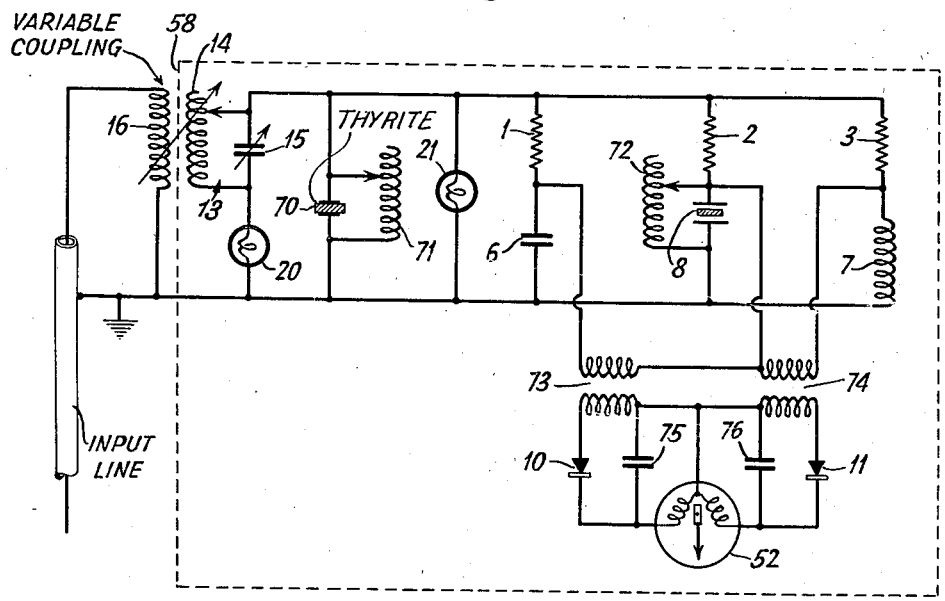

Reference will now be had, for a more complete understanding of the invention, to the following detailed description which is accompanied by a drawing in which Figure 1 shows an embodiment of the present invention; Figure 2 shows a modification of the form of invention shown in Figure 1.

Referring, now, to Figure 1, reference numerals 1, 2 and 3 denote resistances which are connected in series respectively with condenser 6, piezoelectric crystal 8 and inductance 7. The frequency to be measured is applied across the circuit including these 3 branches in parallel. The impedance of resistance 1 and the impedance of condenser 6 are approximately equal at the operating frequency of the device. Likewise, resistance 3 and inductance 7 have approximately equal impedance values at the operating frequency. Resistance 2 has an impedance about equal to the minimum impedance of crystal 8 at resonance. Due to the sharp resonance characteristics of a crystal the current through crystal 8 rapidly changes in phase as the frequency of an impressed voltage is varied from above the resonant frequency of the crystal, where its impedance is predominantly capacitive, and to below the resonant frequency, where its impedance is predominantly inductive, or vice versa. At the junction points between resistance 1 and condenser 6 and the junction point between resistance 3 and inductance 7 there will be little change in phase of the radio frequency voltage with reference to an assumed point of zero or earth potential such as the lower connection between coil 7 and coil 14 as the impressed frequency is passed through the resonant region of the crystal. Furthermore, it should be noted these latter two junction points have voltages with reference to the same level substantially 90 degrees different in phase from each other and differing both in phase and amplitude from the voltage with respect to the same level at the junction between resistance 2 and crystal 8 when the impressed frequency is equal to the resonant frequency of the crystal. A variation in the applied frequency above and below the resonant frequency of the crystal causes differential variations in currents through resistances 4 and 5. Differentially varying voltages are therefore impressed on the two rectifiers 10 and 11. The rectifiers, therefore, cause differentially varying currents through the zero center reverse current meter 12 thus indicating in which direction the applied frequency is different from the resonant frequency of the crystal. If the applied radio frequency voltage or current to the system is held constant, the meter scale of differential meter 12 may be directly calibrated in cycles difference between the crystal resonant frequency and the applied frequency. If this is the case, the input voltage or current should, of course, always have the same predetermined value.

In Figure 1 I have shown a system for adjusting and holding correct calibration of the device. A tuned circuit 13 composed of inductance 14 and variable capacity 15 is shown for obtaining broad tuning to the applied frequency and for reducing the possibility of undesired harmonics or other frequencies causing a wrong indication. The output of the transmitter or other frequency source to be measured is applied to tuned circuit 13 by means of a coupling coil 16. The coupling relationship between coil 16 and coil 14 may be variable in order to vary the input as desired. A second coupling transformer 17 composed of inductance 19 and inductance 18 with a variable coupling relationship therebetween has inductance 19 connected between tuned circuit 13 and the indicating device previously described. In the connection therebetween is shown an incandescent lamp 20. The inductance 18 is connected across tuned circuit 13 with lamp 21 in series therewith. The lamps 20, 21 have tungsten filaments the resistance of which increases rapidly with an increase of current therethrough. For low inputs to tuned circuit 13 lamp 21 has a low resistance. For this condition coupling transformer 17 is adjusted to have a number of turns in the two windings and mutual coupling therebetween such that current through coil 18 tends to force maximum percentage increase in the current through coil 18. Thus, variations in the resistance of lamp 21 tend to make the current in coil 19 vary less rapidly than the current in tuned circuit 13.

Likewise, lamp 20 increases its resistance with increasing current and so tends to allow less than proportional variation in the current through coil 19 to the indicating circuits. In some cases another lamp 21' may be connected in series with the coil 14 of the tuned circuit 13 in order that variations in current in the circuit may vary the series resistance in a direction to reduce the current variations with variations in frequency. Best results will be obtained when the lamps are designed to operate in a range of current which places their filament temperatures below the normal temperatures used for producing light. Thus, the whole system is made relatively unresponsive to variations in input energy insofar as readings of the differential meter are concerned. Other available lamps using other filament materials than tungsten may be used, including tantalum, iron wire, etc. I prefer tungsten lamps only because they are cheap and universally available. Of course, in any case the zero or exact frequency center of the instrument is unaffected by variation in input power level but the calibration for off frequency indications may be if no precautions are taken. Other means of rendering the device insensitive to input level variations will be discussed later.

In addition to the function of regulating the strength of currents to the indicating instrument the lamps 20, 21 may serve the purpose of indicating the correct input level to an operator who may adjust the coupling to the source of alternating current power. The lamps also indicate the presence or absence of input to the device and may likewise be used to light the scale of the differential meter 12.

In operation, if the input level is first made small and then slowly increased lamp 20 will light up brightest first and then lamp 21 will become brightest. The meter scale may be calibrated for a level where the two lamps are of equal brightness and then the operator may be instructed to adjust the input for this condition. The indicating device should preferably be calibrated with the thought that the device will be used under conditions where neither lamp is lighted to full brilliancy when they are equally illuminated. The reason for this is that the change in resistance in the lamps with a change in current is more rapid at the lower temperatures.

In addition to the use of the lamps, "Thyrite" resistors may be shunted across the circuits in order to increase the loading when the input from the transmitter is increased, or "Thyrite" resistors may be substituted for the lamps by using suitable circuits, such as shown in Figure 2 and described more fully with reference to that figure. "Thyrite" is a material developed by the General Electric Company for use in lightning arresters which automatically decreases its resistance at a rapid rate when the potential across it is increased.

In the arrangement shown in Figure 2 the coupling to the source of high frequency power and the coupling to the measuring unit are adjusted until the two lamps 20, 21, which may be placed on each side of the current ratio instrument 52, are equally illuminated. This assures that the current applied to the circuit is the same each time the instrument is used so that it may be directly calibrated in cycles departure from a standard frequency.

When the coupling between coils 16 and 14 is made small and then increased the automatically variable resistance 70 has a high resistance value but its resistance decreases rapidly with increasing voltage across it. Consequently, lamp 21 lights up first and the other lamp 20 then lights up as the resistance of the automatically variable resistance decreases. At a definite value of input the lamps will light equally and this value may be taken as standard for purpose of calibration.

For assisting in overcoming couplings at harmonic and other spurious frequencies an electrostatic shield 58 may be provided between input coupling coils 16, 14. The circuit is also shown tunable by means of variable taps on the input coupling coil 14 and the variable condenser 15 in parallel with it.

The automatically variable resistance 70 may be a block of "Thyrite," a layer of cuprous oxide between metal plates, or any one of the other materials known to decrease resistance rapidly with increasing potential across it. Since the automatically variable resistance has dielectric capacity it is preferable to tune out this capacity for the approximate operating frequency by means of an adjustable parallel shunt 71.

Since the piezo-electric crystal 8 which serves as the frequency standard in the instrument, and its electrodes and mounting, also have dielectric capacity which is undesirable, I have shown means for tuning this capacity for the crystal resonant frequency with an adjustable parallel inductance 72.

In the arrangement of Figure 2 inductive coupling transformers 73, 74 are used, the primaries of which are connected between the points in the circuit which change phase with changing frequency. The secondaries of transformers 73, 74 supply current to rectifiers 10, 11 for operating the indicating instrument 52. This inductive coupling transfers high frequency power but isolates the circuits for direct currents. Except as above noted, the construction and operation of the modification shown in Figure 2 is the same as that shown in Figure 1.

Any suitable type of high frequency rectifier may be used but, for simplicity, I may use two fixed and matched crystal detectors. Crystal detectors which will serve the purpose have been known in the radio art almost from its beginning.

Output currents from the two rectifiers are applied to a current ratio instrument 52, which may consist of a permanent magnet free to turn with respect to two stationary coils set at right angles. The magnet thus always takes a position corresponding to the ratio of currents in the two coils. A pointer attached to the magnet, combined with a suitable scale gives an indication which may be read directly in terms of frequency if a proper calibration has been made.

This arrangement has a wide scale in the region of a balance of currents, corresponding to the correct frequency, and a rapidly closing scale for increasingly unbalanced currents. This is a practical advantage in providing useful indications of relative frequency over a wide range of frequencies combined with ability to read and adjust relative frequencies very accurately to a correct value.

While I have shown and particularly described several modifications of my invention, it is to be distinctly understood that my invention is not limited thereto but may be varied within the scope of the invention.

For example, utilization of the differentially variable currents is not limited to operation of an indicating instrument but, instead, or, in addition, may operate a relay to sound an alarm if the frequency of the current departs too far from a desired value, or to control automatic means for correcting the frequency of the source of current.

I claim:

1. In combination, a tuned circuit, means for applying an alternating current wave to be measured to said tuned circuit, a coupling transformer having one winding connected in series with a resistor having a resistance which varies with the current flow therethrough between said tuned circuit and a frequency measuring circuit and the other winding connected across the said tuned circuit in series with a second resistor having a resistance which varies with current flow therethrough, a third resistor having a resistance which varies with current flow therethrough in said tuned circuit, the coupling between the windings of said coupling transformer being so adjusted that the amplitude of the wave applied to said measuring circuit is substantially unaffected by variations in amplitude of the applied alternating current wave.

2. In combination, a tuned circuit, means for applying an alternating current wave to be measured to said tuned circuit, a coupling transformer having one winding connected in series with a tungsten lamp between said tuned circuit and a measuring circuit and the other winding connected across the said tuned circuit in series with a second tungsten lamp, a third tungsten lamp in said tuned circuit, the coupling between the windings of said coupling transformer being so adjusted that the amplitude of the wave applied to said measuring circuit is substantially unaffected by variations in amplitude of the applied alternating current wave, said measuring circuit comprising a highly selective circuit whereby the phase of current through said circuit varies sharply with variations in frequency, a pair of circuits connected in parallel with said highly selective circuit and being characterized in that currents flowing therethrough differ substantially 90 degrees in phase over a wide band of frequencies, a pair of detectors each having an input and an output, an input of each of said detectors being associated with one of said pair of circuits and means for supplying current to said detectors from said highly selective circuit whereby the current in each of said detectors is the vector sum of the current in its associated circuit and the current in said highly selective circuit, and means for comparing the currents in said detector outputs.

3. In combination, a tuned circuit, means for applying an alternating current wave to be measured to said tuned circuit, a coupling transformer having one winding connected in series with a tungsten lamp between said tuned circuit and a frequency measuring circuit and the other winding connected across the said tuned circuit in series with a second tungsten lamp, a third tungsten lamp in said tuned circuit, the coupling between the windings of said coupling transformer being so proportioned that the amplitude of the wave applied to said measuring circuit is substantially unaffected by variations in amplitude of the applied alternating current wave.

4. In combination, a tuned circuit, means for applying an alternating current wave to be measured to said tuned circuit, a coupling transformer having one winding connected in series with a tungsten filament lamp between said tuned circuit and a measuring circuit and the other winding connected across the said tuned circuit in series with a second tungsten filament lamp, a third tungsten lamp in said tuned circuit, the coupling between the windings of said coupling transformer being so proportioned that the amplitude of the wave applied to said measuring circuit is substantially unaffected by variations in amplitude of the applied alternating current wave, said measuring circuit comprising three parallel branches, one of said branches including an element resonant to said frequency and a resistance connected in series, another of said branches including an inductance and a resistance in series and the third branch including a condenser and a resistance in series, a fourth and fifth resistance connecting the junction in said last two branches to the junction in said first branch, a pair of rectifiers each having one terminal adjustable connected to one of said last named resistances and another terminal connected to a differential meter whereby said meter indicates ratio of currents flowing in said resistances.

5. In combination, an input circuit, means for applying an alternating current wave to be measured to said input circuit, a coupling transformer having one winding connected in series with a resistor having a resistance which varies with the current flow therethrough between said input circuit and a frequency measuring circuit and the other winding connected across said input circuit in series with a second resistor having a resistance which varies with current flow therethrough, a third resistor having a resistance which varies with current flow therethrough so connected in said input circuit as to reduce voltage variations in said input circuit with variations in frequency, the coupling between the windings of said coupling transformer being so adjusted that the amplitude of the wave applied to said measuring circuit is substantially unaffected by variations in amplitude of the applied alternating current wave.

6. In combination, a tuned circuit, means for applying an alternating current wave to be measured to said tuned circuit, means in said tuned circuit for reducing variations in voltage with frequency variations, a frequency measuring circuit for said wave and means for coupling said measuring circuit to said tuned circuit, said means including a pair of conductors, each having a resistance which varies with current flow therethrough, the first of said conductors being so connected that said coupling means accepts less energy from said tuned circuit as the potential thereacross increases and the second of said conductors being so connected that said coupling means transfers less energy to said measuring circuit as the current in said second conductor increases.

7. In combination, an input circuit, means for applying an alternating current wave to be measured to said input circuit, means in said tuned circuit for reducing variations in voltage with frequency variations, a frequency measuring circuit for said wave and means for coupling said measuring circuit to said input circuit, said means including a pair of conductors, each having a resistance which varies with current flow therethrough, the first of said conductors being so connected that said coupling means accepts less energy from said input circuit as the potential thereacross increases and the second of said conductors being so connected that said coupling means transfers less energy to said measuring circuit as the current in said second conductor increases.

8. In combination, a tuned circuit, means for applying an alternating current wave to said tuned circuit, a coupling transformer having one winding connected in series with a resistor having a resistance which varies with the current flow therethrough between said tuned circuit and an output circuit and the other winding connected across the said tuned circuit in series with a second resistor having a resistance which varies with current flow therethrough, a third resistor having a resistance which varies with current flow therethrough in said tuned circuit, the coupling between the windings of said coupling transformer being so adjusted that the amplitude of the wave applied to said output circuit is substantially unaffected by variations in amplitude of the applied alternating current wave.

9. In combination, a tuned circuit, means for applying an alternating current wave to said tuned circuit, a coupling transformer having one winding connected in series with a tungsten lamp between said tuned circuit and an output circuit and the other winding connected across the said tuned circuit in series with a second tungsten lamp, a third tungsten lamp in said tuned circuit, the coupling between the windings of said coupling transformer being so proportioned that the amplitude of the wave applied to said output circuit is substantially unaffected by variations in amplitude of the applied alternating current wave.

CLARENCE W. HANSELL.